May 12, 1959 T. REUMERMAN ET AL 2,886,239

CHECK SYMBOL COMPUTER

Filed Feb. 16, 1954 6 Sheets-Sheet 3

United States Patent Office 2,886,239

Patented May 12, 1959

2,886,239

CHECK SYMBOL COMPUTER

Theodorus Reumerman and Cornelis A. S. Hamelink, Zandvoort, Netherlands; said Hamelink assignor to Willem Hendrik Theodorus Helmig, Leiden, Netherlands Application February 16, 1954, Serial No. 410,474

5 Claims. (Cl. 235—153)

This invention relates to relay counters, and more in particular to relay counters of the type comprising a plurality of relay stages arranged in series, wherein each relay stage has two stable conditions, and is adapted to change its condition upon reception of an impulse and to remain in the new condition until a next impulse is received, and wherein each relay stage, except the last one, transfers an impulse to the next stage when it is changed over to one of its two conditions.

The invention further relates to calculating devices comprising relay counters of the above-indicated type, and to circuits for determining a check symbol for a symbol group and for checking a symbol group already provided with a check symbol, in which a relay counter of this type is used.

Relay counters of the above-indicated type are known per se. If the two stable conditions of each relay stage are indicated by 0 and 1, and if it is further assumed that the series consists of four relay stages A, B, C and D, and that stages A, B, and C always transfer an impulse to the next stage when they are changed over to their 0-condition, the following operation is obtained when a series of impulses is supplied to stage A. When the relay stages initially all are in the 0-condition, stage A is brought into the 1-condition by the first impulse. The second impulse resets stage A to its 0-condition, and an impulse is transferred to stage B, which is brought into its 1-condition. The third impulse again brings stage A into the 1-condition. The fourth impulse resets stage A to its 0-condition, and an impulse is transferred to stage B, which is likewise reset to its 0-condition, so that an impulse is transferred to stage C; thus, stage C is brought into its 1-condition, and so on.

Hence, the counter constituted by the four stages successively occupies the following positions:

| Position | D | C | B | A |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

Thus, it will be seen that the counter counts the impulses supplied to stage A according to the binary number system. If a sixteenth impulse is supplied to stage A, stages A, B, C and D are successively reset to their 0-condition, so that the counter again occupies position 0. In consequence, the counter may be said to have a closed cycle of 16 positions. In general, a counter comprising $m$ stages will have a closed cycle of $2^m$ positions.

Figure wheels as used in the ordinary registers for decimal numbers have a closed cycle of ten positions. Thus, if it is desired to substitute a relay counter of the above-indicated type for such a figure wheel, it will be necessary to suppress 6 of its 16 positions. This may be done either by automatically resetting the counter to position 0 when it reaches position 10, or by automatically advancing the counter to position 6 when it returns to position 0. For instance, when the last-mentioned method is used, stage D is arranged to transfer impulses to stages B and C when it is changed over to its 0-position. A relay counter of this kind, having four relay stages and six suppressed positions, is known in the art as a "scale of ten."

A register for decimal numbers may be obtained by combining a plurality of such counters, each for one of the decimal positions, and by providing each counter with means for carrying over a unit to the next counter after each complete cycle of ten positions. These carry over means may be combined with the means for automatically resetting or advancing the counter, as will be more fully explained hereinafter. It will be understood that a register comprising a plurality of relay counters each having a closed cycle of ten positions, and each provided with means for carrying over a unit to the next counter after each complete cycle, may be used in calculating devices, in particular for adding numbers by inserting the digits of each number each in the appropriate counter.

The known "scales of ten" are controlled by means of impulses supplied to the first relay stage (A), so that the number of control impulses to be supplied to the counter for inserting a digit is equal to the numerical value of the digit. Thus, the mean number of control impulses required for inserting a digit is 4.5; as the impulses must be spaced at a sufficient time interval to allow for the operation of the relay stages, this makes the counter relatively slow in operation.

It is an object of the present invention to provide means whereby a relay counter of the above-indicated kind may be operated more rapidly.

Another object of the invention is to provide a register for decimal numbers comprising a plurality of relay counters of the above-indicated type which may be operated more rapidly than the known registers of this kind.

A further object of the invention is to provide an improved calculating device for decimal numbers.

According to a main feature of the present invention, each digit to be inserted in a relay counter is broken down into its binary components, and each binary components is separately inserted by supplying one impulse to the relay stage representing this component. This reduces the mean number of control impulses required for inserting a digit to 1.5, and it will be clear that this enables the counter to be operated much more rapidly It is known to facilitate the detection of errors in symbol groups by adding to each symbol group a check symbol derived from the symbols of the group according to a predetermined arithmetical rule. This rule is chosen in such manner that the check symbol pertaining to a symbol group is altered whenever a wrong symbol is placed in one of the positions of the group or whenever two adjacent symbols change their places. By again determining the check symbol of the symbol group and comparing the same with the check symbol added to the group, it is always possible to determine with great certainty whether a mutilation of the symbol group has occurred. The check symbols used in this system are selected from a series of N different symbols. If the symbol groups to be checked are numbers, it is preferred to take for N a prime number greater than 10, such as 11, or 13. For checking symbol groups composed out of the letters of the alphabet, a series of 27 different check symbols may be used with advantage ($N=27$).

The known devices for determining a check symbol for a symbol group and for checking a symbol group already provided with a check symbol generally comprise an indicator adapted to occupy N different positions, for instance an N-partite counting wheel, a shaft adapted to be set in N different positions, or a bundle of N conductors of which only one carries a current at any time.

It is a further object of the present invention to modify a relay counter of the above-indicated type in such manner that it may fill the role of the said indicator.

A still further object of the invention is to provide an improved device for determining a check symbol for a symbol group, which is extremely simple in construction.

According to a further feature of the invention, the indicator of a device for determining a check symbol for a symbol group is a relay counter of the above-indicated type, having $m$ relay stages and ($2^m$—N) suppressed positions, i.e. a closed cycle of N positions. In order to determine the check symbol of a symbol group numbers dependent on the identity of each symbol and on its position in the symbol group are successively entered into the relay counter. For this purpose, each of the said numbers is broken down into its binary components, and each binary component is separately entered by supplying one impulse to the relay stage representing this component.

As stated hereinbefore, suitable values for N are, for instance, 11, 13 and 27.

A relay counter having a closed cycle of 11 positions may be obtained by providing four relay stages A, B C and D, and means for automatically resetting the counter to position 0 when it reaches position 11, or for automatically advancing the counter to position 5 when it returns to position 0. For instance, stage D may be arranged to transfer impulses to stages A and C whenever it is reset to its 0-condition. Thus, if an impulse is supplied to stage A at a moment, at which the counter occupies position 15, stages A, B, C and D are first successively reset to their 0-condition, but when stage D returns to its 0-condition, impulses are transferred to stages A and C, so that these two stages are brought into their 1-condition. Hence, position 15 is followed by position 5, i.e. the counter has a closed cycle of 11 positions, to wit positions 5–15.

In order to obtain a closed cycle of 13 positions, relay D may be arranged to transfer impulses to stages A and B whenever it is reset to its 0-condition, so that position 15 of the counter is followed by position 3, and the closed cycle consists of positions 3–15.

A counter with a closed cycle of 27 positions may be obtained by providing 5 relay stages ($m=5$), arranged in such manner that the fifth stage transfers impulses to the first and third stages whenever it is reset to its 0-condition; thus, position 31 is followed by position 5, i.e. the closed cycle consists of positions 5–31.

Hereinbefore, it has been assumed that the relay stages transfer impulses either to the next stage or to one or more of the preceding stages whenever they are reset to their 0-condition. However, the relay counter may also be arranged in such manner that the stages transfer impulses whenever they are changed over to their 1-condition. In this case, the following operation is obtained for a counter with four relay stages, having a closed cycle of 11 positions. If an impulse is supplied to stage A at a moment, at which the counter occupies position 0, so that stages A, B, C and D all are in the 0-condition, stage A is first brought into its 1-condition. Stage A transfers an impulse to stage B, which is likewise brought into its 1-condition and transfers an impulse to stage C, and so on. Thus, stages A, B, C and D are successively brought into their 1-condition; however, as soon as stage D reaches its 1-condition, impulses are transferred to stages A and C, so as to reset these stages to their 0-condition, and the counter is finally brought into position 10 (1 0 1 0). Hence, position 0 is followed by position 10. The next impulse brings stage A into its 1-condition, so that an impulse is transferred to stage B, which is brought into its 0-condition. Hence, position 10 is followed by position 9, and so on. The counter now has the cycle 0, 10, 9, 8, 7, 6, 5, 4, 3, 2, 1.

In a similar manner, a counter having a closed cycle of 13 positions may be caused to pass successively through positions 0, 12, 11, . . . 2, 1, and a counter having a closed cycle of 27 positions may be caused to pass successively through positions 0, 26, 25, . . . 2, 1. Likewise, the cycle of a "scale of ten" could be made to consist of positions 0, 9, 8, . . . 2, 1.

The relay stages used in the devices according to the present invention may be of any desired construction, provided that they have two stable conditions, and are adapted to change their condition on reception of an impulse and to remain in the new condition until a next impulse is received. Suitable examples are: an electronic trigger circuit of the Eccles-Jordan type, a latch relay, or a combination of two electromagnetic relays.

The invention will be further explained with reference to the accompanying drawings, in which some preferred embodiments of the invention are shown.

Figure 1:
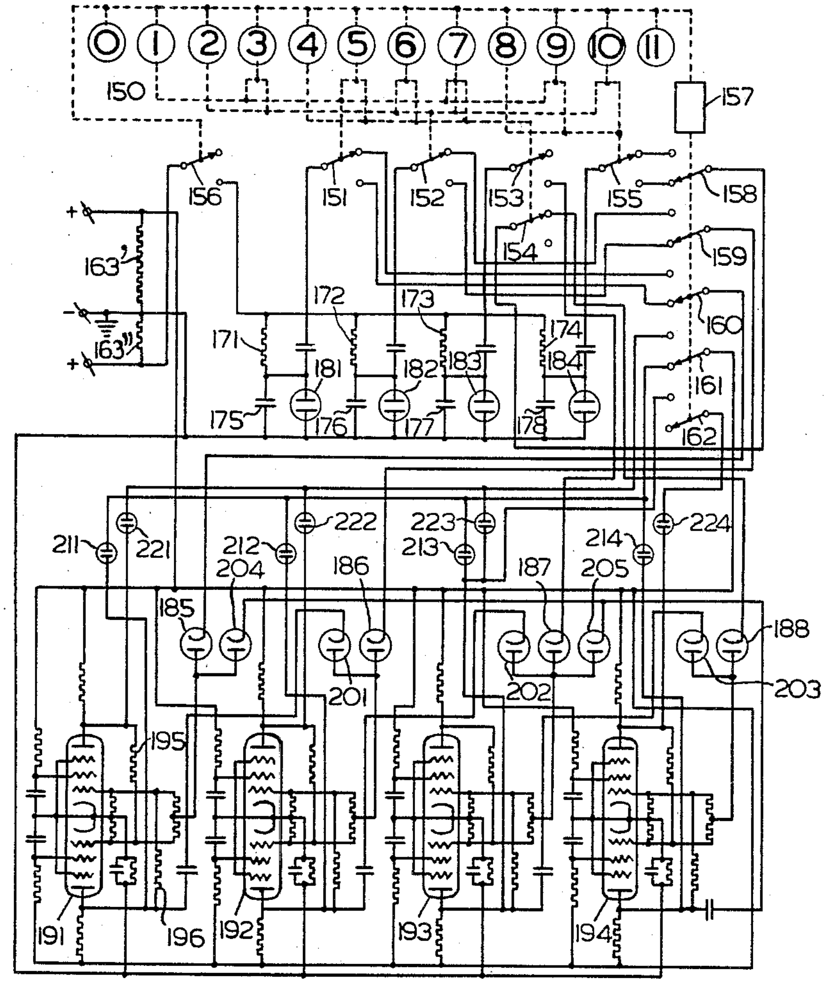
Fig. 1 is a circuit diagram of a device for determining a check symbol for a symbol group and for checking a symbol group already provided with a check symbol, which is operated by means of a key board and may be incorporated, if desired, in an adding or accounting machine. The relay counter used in this device consists of four electronic trigger circuits.

The device shown in Fig. 1 comprises a relay counter consisting of four vacuum tubes 191, 192, 193 and 194. Each of these tubes contains two pentode systems, and each pentode system comprises a cathode, a control grid connected with the cathode through a leakage resistor, a screen grid connected with the cathode through a condenser and with a source of positive potential through a resistor, a suppressor grid directly connected with the cathode, and an anode connected with a source of positive potential through a load resistor. The cathodes of the two pentode systems are interconnected and grounded through a cathode resistor, to which a condenser is connected in parallel, in order to provide a suitable control grid bias. This manner of connecting the various electrodes of a pentode is well known in the art, so that a further explanation appears to be superfluous.

The anode of the upper pentode system of tube 191 is connected through a resistor 195 with the control grid of the lower pentode system. Similarly, the anode of the lower system is connected with the control grid of the upper system through a resistor 196. Thus, if the upper pentode system of tube 191 is conducting, the control grid potential of the lower pentode system is decreased to such an extent that the anode current of the lower pentode system is cut off, and vice versa. Hence, the relay stage constituted by the two pentode systems in tube 191 has two stable conditions, a 0-condition in which the upper pentode system is conducting and the lower pentode system is cut off, and a 1-condition in which the lower pentode system is conducting and the upper pentode system is cut off.

Similar coupling resistors have been provided between the anodes and control grids of tubes 192, 193 and 194, so that each of these tubes constitutes, together with the associated circuit elements, a relay stage having two stable conditions.

The counter constituted by the four relay stages is operated by means of negative control impulses supplied to the control grids of the four tubes through diodes 185, 186, 187, 188. For this purpose, the anode of each of these diodes is connected through suitable decoupling resistors with the control grids of both pentode systems of the associated tube.

A control impulse supplied in this manner to the control grids of one of the relay stages causes this stage to change its condition. Suppose, for instance, that the first stage is in its 0-condition, i.e. that the upper pentode system of tube 191 is conducting and the lower pentode system is cut off. Due to the voltage drop in the series resistor, the screen grid of the upper pentode system will have a lower potential than the screen grid of the lower system. Now, when a negative impulse is supplied through diode 185 to the control grids of tube 191, both pentode systems are cut off for the duration of the impulse. The screen grid potentials are not materially changed during this time interval, due to the presence of the condensers between the screen grids and the screen grids and the cathodes. Thus, when the impulse ceases, the lower pentode system, having a higher screen grid potential, will be the first to conduct, and it will cut off the upper system, i.e. the stage will change its condition. The next impulse to be supplied to the control grids of tube 191 will reset the first stage to its 0-condition in exactly the same manner.

The anode of the lower pentode system of each of the tubes 191, 192, and 193 is connected through a suitable coupling condenser and through a diole 201, 202 or 203, respectively, with the control grids of the next tube. Thus, whenever one of the three first stages is changed over to its 1-condition, and the anode voltage of the lower pentode system is suddenly lowered due to the voltage drop in the load resistor, this causes a negative impulse to be supplied to the control grids of the next stage, so that the next stage likewise changes its condition. The anode of the lower pentode system of tube 194 is similarly connected through diodes 204 and 205 with the control grids of tubes 191 and 193. Thus, whenever the last stage is changed over to its 1-condition, negative impulses are supplied to the first and third stages to change the condition of these stages.

The position of the counter constituted by the four relay stages may be found at any time, in binary notation, by writing down the conditions of stages 194, 193, 192 and 191, in this order. For instance, if stages 191, 192 and 193 are in their 1-condition (lower pentode system conducting), and stage 194 is in its 0-condition (upper pentode system conducting), the position of the counter is 0 1 1 1, which is the binary notation for 7.

In order to explain the operation of the counter, it is assumed that the counter is initially in position 0 (0 0 0 0), and that a sequence of control impulses is supplied through diode 185 to stage 191. The first control impulse brings stage 191 into its 1-condition, so that it supplies an impulse through diode 201 to stage 192; stage 192 is brought into its 1-condition and supplies an impulse through diode 202 to stage 193; stage 193 is brought into its 1-condition and supplies an impulse through diode 203 to stage 194; stage 194 is brought into its 1-condition and supplies impulses through diodes 204 and 205 to stages 191 and 193; stages 191 and 193 are brought into their 0-condition and the final position of the counter is 1 0 1 0 (10). The second control impulse brings stage 191 into its 1-condition, so that it supplies an impulse through diode 201 to stage 192; stage 192 is brought into its 0-condition, and the final position of the counter is 1 0 0 1 (9). The third control impulse brings stage 191 into its 0-condition, and the final position of the counter is 1 0 0 0 (8), and so on. Thus, it will be understood that the counter passes successively through positions 0, 10, 9, 8, 7, 6, 5, 4, 3, 2, and 1.

Now suppose that the control impulses are supplied to stage 192 instead of stage 191. The first control impulse brings stage 192 into its 1-condition, so that it supplies an impulse through diode 202 to stage 193; stage 193 is brought into its 1-condition and supplies an impulse through diode 203 to stage 194; stage 194 is brought into its 1-condition and supplies impulses through diodes 204 and 205 to stages 191 and 193; stage 191 is brought into its 1-condition and supplies an impulse to stage 192, which is brought into its 0-condition; stage 193 is brought into its 0-condition, and the final position of the counter is 1 0 0 1 (9). The second control impulse brings stage 192 into its 1-condition, so that it supplies an impulse through diode 202 to stage 193; stage 193 is brought into its 1-condition and supplies an impulse through diode 203 to stage 194; stage 194 is brought into its 0-condition, and the final position of the counter is 0 1 1 1 (7), and so on. The counter now passes successively through positions 0, 9, 7, 5, 3, 1, 10, 8, 6, 4, and 2.

In a similar manner, it will be found that the counter passes successively through positions 0, 7, 3, 10, 6, 2, 9, 5, 1, 8 and 4 if the control impulses are supplied to tube 193, and through positions 0, 3, 6, 9, 1, 4, 7, 10, 2, 5 and 8 if the control impulses are supplied to tube 194.

Thus, it will be understood that the counter is set back through 1 position by each impulse supplied through diode 185 to tube 191, through 2 positions by each impulse supplied through diode 186 to tube 192, through 4 positions by each impulse supplied through diode 187 to tube 193, and through 8 position by each impulse supplied through diode 188 to tube 194.

Diodes 185—188 and 201—205 serve to prevent any positive impulses from being supplied to the grids of tubes 191—194, and to separate the circuits through which impulses may be supplied to these tubes. It will be understood that the cathodes of tubes 191—194, and of diodes 185—188 and 201—205 are heated in the usual manner by means of heating circuits not shown in the drawing.

Anode and screen grid voltages for tubes 191—194 are supplied by a voltage source schematically represented by a bleeder resistor 163'.

The device shown in Fig. 1 is operated by means of a keyboard, comprising twelve keys 150 bearing the numbers from 0 to 11. The check symbol of a number consisting of any desired number of digits may be determined by successively striking the digits, as read from left to right, on the keys bearing the numbers from 0 to 9. The keys bearing the numbers 10 and 11 only serve for striking the check symbols 10 and 11, for purposes to be explained hereinafter.

As schematically indicated by dotted lines, the keys 150 are mechanically coupled with a plurality of switches 151—156, in such manner that one or more of these switches are changed over when a key is depressed, and resume their initial position when the key is released. Furthermore, the keys are coupled with a series of switches 158—162 by means of a device 157 constructed in such manner that switches 158—162 change their position whenever a depressed key is released.

Switches 156 and 158—162 are coupled with all of the keys; the remaining switches 151—155 are coupled with some of the keys only, to wit switch 151 with the keys bearing the numbers 1, 3, 5, 7 and 9, switch 152 with the keys bearing the numbers 2, 3, 6, 7 and 10, switches 153 and 154 with the keys bearing the numbers 4, 5, 6 and 7, and switch 155 with the keys bearing the numbers 8, 9 and 10.

For purposes of explanation, the position of switches 151—156 and 158—162 as shown in the drawing will be indicated as the 0-position, and their other position as the 1-position. When one of the keys bearing the numbers from 1 to 10 is depressed, the corresponding positions of switches 155, 153, 152 and 151, in this order, may be found by writing down the number on the depressed key in the binary notation. For instance, when key 6 is depressed, the positions of the said switches is indicated by 0 1 1 0, i.e. switches 155 and 151 are in the 0-position, and switches 153 and 152 in the 1-position. Switch 154 is mechanically coupled with switch 153, so that it always has the same position as switch 153. Thus, it will be understood that a digit struck on one of the keys bearing the numbers from 1 to 10 is broken down into its binary components by switches 151—155.

Means for selectively operating a plurality of switches by means of a keyboard, as used for operating switches 151—156, are well known in the art, so that a detailed description appears to be superfluous. Such means may be formed, for instance, as a plurality of slidable rails, each coupled with one of the switches, and placed under the keyboard so as to be displaced by the key levers. Incisions in the said rails in the vicinity of each key lever determine the switches to be operated by each key. A mechanism of this kind is used in teleprinter devices.

Figure 2:
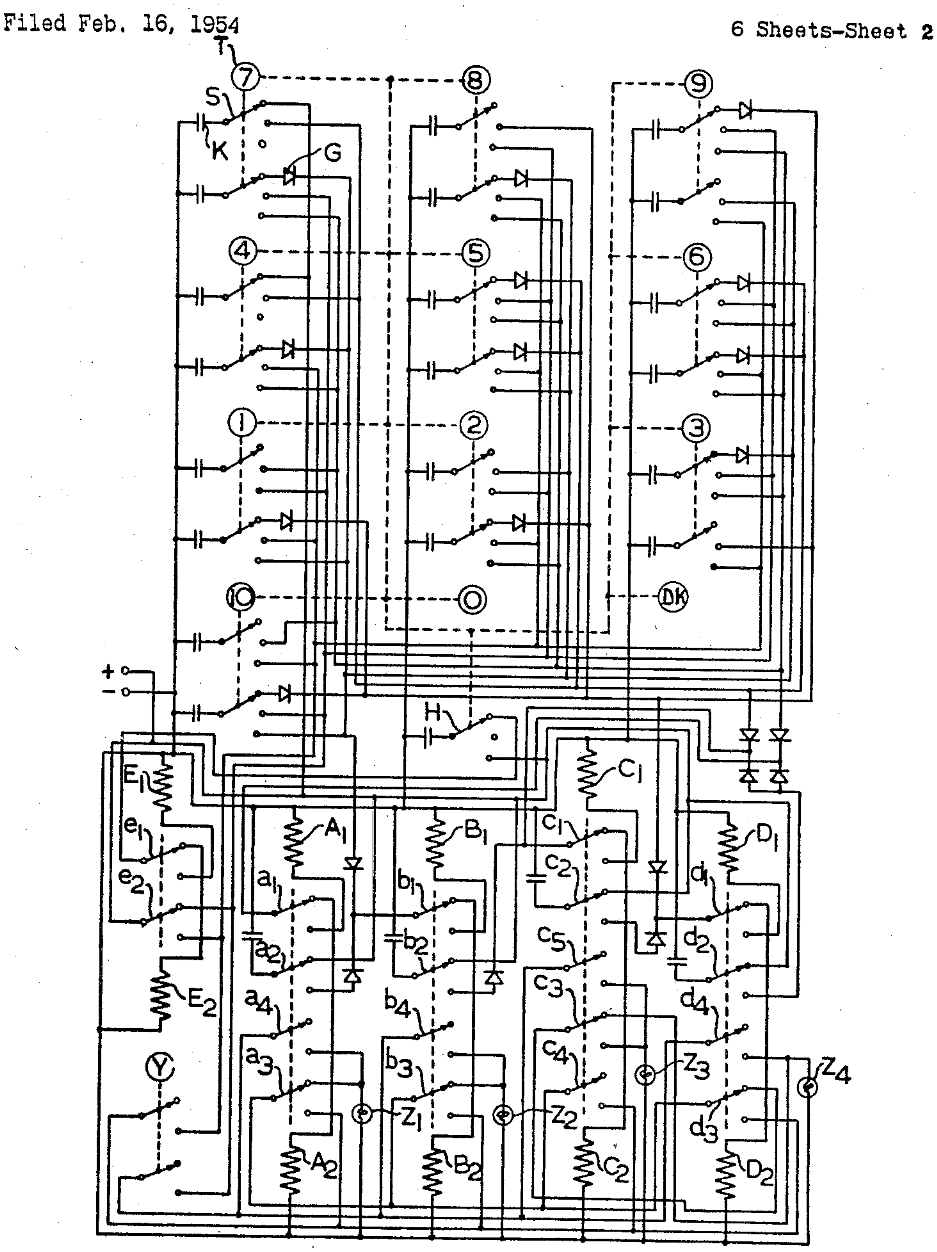
Fig. 2 is a circuit diagram of a similar device in which the relay counter consists of four latch relays.
Figure 5:
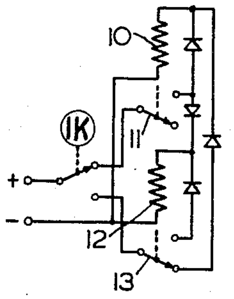
Fig. 5 shows a relay stage consisting of two electromagnetic relays.

The device 157 used for operating switches 158—162 may be constructed in various ways. For instance, the keys may move a shaft bearing a set of rotatory switches by means of a pawl and ratchet, or the device 157 may consist of the combination of a switch H and a relay E as shown in Fig. 2, or of a switch and two relays as shown in Fig. 5. Other mechanical and electric devices for the same purpose will readily occur to the expert.

The negative control impulses to be used for operating the relay counter are generated by means of four impulse generators, each consisting of a resistor 171, 172, 173 or 174, a condenser 175, 176, 177 or 178, respectively, connected in series with said resistor, and a gaseous discharge tube 181, 182, 183 or 184, respectively, connected in parallel with said condenser. Resistors 171, 172, 173 and 174 are connected through switch 156 with the positive terminal of a voltage source, schematically represented as a bleeder resistor 163″. Thus, as soon as one of the keys 150 is depressed and switch 156 is closed, condensers 175, 176, 177 and 178 are positively charged through resistors 171, 172, 173 and 174, respectively. As soon as the voltage across one of the said condensers reaches the ignition voltage of the parallel connected discharge tube, this tube is ignited and the condenser is suddenly discharged. The sudden discharge of the condenser produces a negative impulse, which is supplied through a suitable coupling condenser to one of the switches 151, 152, 153 and 155, which are each associated with one of the impulse generators.

The charging circuits of the four condensers 175—178 have different time constants, so that the said negative impulses are produced at different moments. For instance, resistor 171 may have a relatively low resistance value, and each of the resistors 172, 173 and 174 may have a higher resistance value than the preceding one so that the impulses are successively supplied to switches 151, 152, 153 and 154, in this order.

Although separate voltage sources, symbolized by bleeder resistors 163′ and 163″ are shown for feeding the relay stages and the impulse generators, it will be understood that it would be possible to use a common voltage source. For instance, switch 156 could be connected to a tapping point on resistor 163′. However, the use of separate voltage sources presents the advantage that the operations of the relay stages and of the impulse generators are independent of each other.

The relay stages to which the generated control impulses are supplied are determined by the positions of switches 151—155 and 158—162 in accordance with the arithmetical rule on which the checking system is based. In the embodiment of Fig. 1, this arithmetical rule is as follows; the check symbol of a number is equal to the remainder obtained on dividing the number by 11. As is well known, the remainder $R_{11}(Z)$ obtained on division of a number Z by 11 is equal to the remainder obtained on division by 11 of the sum of the digits occurring in odd positions of the number, decreased by the sum of the digits occurring in even positions, the odd and even positions being determined by counting the positions from right to left. Thus, if the check symbol is indicated by $r_c$, a number $$Z=\overline{p_n p_{n-1} p_{n-2} \dots p_2 p_1}$$

comprising $n$ digits, will have a check symbol:

$$r_c=R_{11}(p_1-p_2+ \dots -p_{n-1}+p_n)$$

if $n$ is odd, and $$r_c=R_{11}(p_1-p_2+ \dots p_{n-1}-p_n)$$

if $n$ is even.

The arrangement of switches 151—155 and 158—162 is such that, if a certain digit $p_i$ is struck when switches 158—162 occupy their 0-position (as shown), impulses are supplied to a combination of relay stages 191—194 such that the counter is set back through $p_i$ positions. If a digit $p_i$ is struck when switches 158—162 are in their 1-position, impulses are supplied to a combination or relay stages 191—194 such that the counter is set back through $(11-p_i)$ steps. For instance, if key 3 is struck when switches 158—162 are in their 0-position, switches 151 and 152 are changed over, and impulses are supplied through switches 160 and 159 to stages 191 and 192; if key 3 is struck when switches 158—162 are in their 1-position, an impulse is only supplied through switches 158 and 154 to stage 194. If key 7 is struck when switches 158—162 are in their 0-position, switches 151, 152 and 153 are changed over, and impulses are supplied through switches 151 and 160 to stage 191, through switches 152 and 159 to stage 192 and through switch 153 to stage 193; if key 7 is struck when switches 158—162 are in their 1-position, an impulse is only supplied through switch 153 to stage 193.

The position of switches 158—162 when the first digit of a number Z is struck, is determined by chance, as these switches are not returned to their initial position after a number has been handled. If switches 158—162 originally occupy their 0-position, the number of steps through which the counter is set back when the number Z is struck, amounts to $$t=p_n+11-p_{n-1}+ \dots +11-p_2+p_1$$

if $n$ is odd. In this case, $r_c$ will be equal to $R_{11}(t)$, and switches 158—162 will occupy their 1-position after the number has been struck. If the number Z contains an even number of digits, we find:

$$t=p_n+11-p_{n-1}+ \dots +p_2+11-p_1$$

in this case, $r_c$ will be equal to $11-R_{11}(t)$, and switches

158—162 will occupy their 0-position when the number has been struck.

On the other hand, if switches 158—162 initially occupy their 1-position, we find for an odd number of digits:

$$t=11-p_n+p_{n-1}+ \ldots +p_2+11-p_1$$

so that $r_c$ will be equal to $R_{11}(t)$, and switches 158—162 will occupy their 0-position after the number has been struck. For an even number of digits, we find:

$$t=11-p_n+p_{n-1}+ \ldots +11-p_2+p_1$$

so that $r_c$ will be equal to $R_{11}(t)$, and switches 158—162 will occupy their 1-position after the number has been struck.

Of course, the counter is always reset to position 0 before a number is struck, so that the number of steps $t$ is always measured from position 0. As the counter is set back through $t$ steps, and has a closed cycle of 11 steps, the final position of the counter will be $$q=11-R_{11}(t)$$

Thus, we find that the check symbol will be equal to $q$ if switches 158—162 finally occupy their 0-position, and equal to $11-q$ if switches 158—162 finally occupy their 1-position.

The check symbol is read, in binary notation, by means of neon tubes 211—214 and 221—224. Each binary component is represented by two neon tubes, i.e. component 1 by tubes 211 and 221, component 2 by tubes 212 and 222, component 4 by tubes 213 and 223, and component 8 by tubes 214 and 224. Tubes 211—214 are operative when switches 158—162 are in their 0-position, and tubes 221—224 are operative when switches 158—162 are in their 1-position.

If switches 158—162 are in their 0-position (as shown), each of the tubes 211—214 is inserted between the positive terminal of voltage source 163' and the anode of the lower pentode system of the associated relay stage, so that the tube is ignited if the associated relay stage is in its 1-condition. If switches 158—162 are in their 1-position, tubes 221 and 222 are each connected between said positive terminal and the anode of the upper pentode system of the associated relay stage, so that each of these tubes is ignited if the associated relay stage is in its 0-position; tube 223 is inserted between said positive terminal and the anode of the lower pentode system of stage 193, so that it is ignited if stage 193 is in its 1-condition; tube 224 is inserted between the anodes of the upper pentode system of stage 194 and the lower pentode system of stage 193, so that it is ignited when stages 193 and 194 are in the same condition, i.e. both in the 0-condition.

The following table shows the reading as taken from the neon tubes in each position of the counter:

| position of counter ($q$) | reading ($r_c$) 158–162 in 0-position | reading ($r_c$) 158–162 in 1-position |
|---|---|---|
| 0 0 0 0 (0) | 0 0 0 0 (0) | 1 0 1 1 (11) |
| 1 0 1 0 (10) | 1 0 1 0 (10) | 0 0 0 1 (1) |
| 1 0 0 1 (9) | 1 0 0 1 (9) | 0 0 1 0 (2) |
| 1 0 0 0 (8) | 1 0 0 0 (8) | 0 0 1 1 (3) |
| 0 1 1 1 (7) | 0 1 1 1 (7) | 0 1 0 0 (4) |
| 0 1 1 0 (6) | 0 1 1 0 (6) | 0 1 0 1 (5) |
| 0 1 0 1 (5) | 0 1 0 1 (5) | 0 1 1 0 (6) |
| 0 1 0 0 (4) | 0 1 0 0 (4) | 0 1 1 1 (7) |
| 0 0 1 1 (3) | 0 0 1 1 (3) | 1 0 0 0 (8) |
| 0 0 1 0 (2) | 0 0 1 0 (2) | 1 0 0 1 (9) |
| 0 0 0 1 (1) | 0 0 0 1 (1) | 1 0 1 0 (10) |

It is pointed out that a reading 11 is found in position 0 of the counter when switches 158—162 are in their 1-position. Of course, a remainder 11 found on dividing a certain number by 11 is equivalent to a remainder 0; thus, the reading 11 may be considered to be equivalent to a reading 0.

As $r_c=R_{11}(Z)$, the number Z may be represented by $Z=11b+r_c$, $b$ being a whole number. Thus, if the check symbol $r_c$ is written down after the number Z, a new number $Z'=10Z+r_c=11(b+r_c)$ is obtained. This new number is always a whole multiple of 11, so so that it has the check symbol 0. It follows, firstly, that the relay counter may always be returned to position 0 after a number has been struck by striking the check symbol read on the neon tubes, and, secondly, that a number received together with its check symbol may be checked by striking the complete symbol group on the key board and checking whether the final check symbol 0 (or 11) is obtained. The keys bearing the numbers 10 and 11 have been specially provided in order that the check symbols 10 and 11 may be struck on the key board. Of course, keys 0 and 11 have exactly the same function, so that key 11 might be left out, if desired.

As an example of the operation of the above-described device, it will be assumed that the check symbol of the number 36835 is to be determined. First of all, the neon tubes are read to see whether the counter is in position 0. If this should not be the case, the check symbol as read on the neon tubes is struck on the key board, whereby the counter is returned to position 0. After that, the digits 3, 6, 8, 3 and 5 are successively struck on the key board. If switches 158—162 are initially in their 0-position, the counter is set back through 3+5+8+8+5=29 steps, and its final position will be 4, with switches 158—162 in their 1-position, so that the check symbol 7 is read on the neon tubes. If switches 158—162 are initially in their 1-position, the counter will be set back through 8+6+3+3+6=26 steps, and its final position will be 7, with switches 158—162 in their 0-position, so that the check symbol 7 is read again on the neon tubes. Of course, 7 is the remainder obtained when the number 36835 is divided by 11.

If the number 36835 is received together with its check symbol 7, it is checked by striking the complete group 368357 on the key board. If switches 158—162 are initially in their 0-position, the counter will be set back through 3+5+8+8+5+4=33 steps, so that it is returned to position 0. If switches 158—162 are initially in their 1-position, the counter is set back through 8+6+3+3+6+7=33 steps, so that it is likewise returned to position 0. In both cases, the check symbol 0 (or 11) is read, so that the number is found to be right.

In the device shown in Fig. 2, the relay counter consists of four latch relays A, B, C and D, each constituting one of the relay stages. Relay A has two windings $A_1$ and $A_2$, and four contacts $a_1$, $a_2$, $a_3$ and $a_4$; relay B has two windings $B_1$ and $B_2$, and four contacts $b_1$, $b_2$, $b_3$ and $b_4$; relay C has two windings $C_1$ and $C_2$, and five contacts $c_1$, $c_2$, $c_3$, $c_4$ and $c_5$; relay D has two windings $D_1$ and $D_2$, and four contacts $d_1$, $d_2$, $d_3$ and $d_4$. All relays have been shown in their 0-position, corresponding with the 0-condition of the relay stage in question. The required impulses are obtained by discharging condensers K through the relay windings, and are supplied to contacts $a_1$, $a_2$, $a_3$ and $a_4$, respectively.

In the 0-position of relay A as shown, winding $A_2$ is connected with contact $a_1$. Thus, when an impulse is supplied to contact $a_1$, winding $A_2$ is energized, so that relay A is brought into its 1-position. By means of a locking device (not shown), the relay is kept in this position until a further impulse is supplied. This new impulse is supplied through contact $a_1$ to winding $A_1$, whereby the relay is returned to its 0-position; in this position, the relay is again locked until the reception of a next impulse. The operation of relays B, C and D is similar.

If the counter initially occupies position 0, in which the four relays all occupy their 0-position, as shown in the drawing, the operation of the counter upon reception of the first impulse by relay A is as follows. First of all, relay A is brought into its 1-position. The condenser K connected with contact $a_2$, which has been charged by the voltage source in the 0-position of the relay A, is now discharged through contacts $a_2$ and $b_1$ and winding $B_2$, so that relay B is brought into its 1-position. Thereupon, the condenser connected with contact $b_2$ is discharged through contacts $b_2$ and $c_1$ and winding $C_2$, so that relay C is brought into its 1-position. After that, the condenser connected with contact $c_2$ is discharged through contacts $c_2$ and $d_1$ and winding $D_2$, so that relay D is brought into its 1-position. Finally, the condenser connected wtih contact $d_2$ is discharged through contact $d_2$, through contact $a_1$ and winding $A_1$ on the one side, and through contact $c_1$ and winding $C_1$ on the other side, so that relay A and C are brought into their 0-position. Thus the final new position of the counter is position 10 (1 0 1 0). The next impulse supplied to relay A returns relay A to its 1-position, so that this relay transfers an impulse to relay B, which is brought into its 0-position. The counter is now brought into position 9 (1 0 0 1). It may easily be seen that the next impulse will bring the counter into position 8, and so on, so that the counter passes through a closed cycle, consisting of positions 0, 10, 9, 8, 7, 6, 5, 4, 3, 2 and 1, exactly like the counter shown in Fig. 1. Impulses supplied to relays B, C and D also cause the same operation as in the counter shown in Fig. 1.

The device shown in Fig. 2 further comprises a change-over relay E, having substantially the same construction as relays A, B, C and D, and provided with two windings $E_1$ and $E_2$, and with two contacts $e_1$ and $e_2$. This change-over relay changes its position each time after a key has been struck and has the same function as switches 158—162 in the device shown in Fig. 1.

The device according to Fig. 2 is operated by means of a key board comprising eleven keys T, bearing the numbers from 0 to 10. The keys bearing the numbers from 0 to 9 may be used for striking the digits of a number to be checked, or for which a check symbol has to be determined, as well as for striking the check symbols from 0 to 9; the key bearing the number 10 only serves for striking the check symbol 10.

Furthermore, a key DK, having the same function as key 0, has been provided for purposes to be explained hereinafter.

In a similar manner as in the device shown in Fig. 1, the counter is set back through $p_i$ steps if a digit $p_i$ is struck when relay E is in its 0-position (as shown), and through $(11—p_i)$ steps if a digit $p_i$ is struck when relay E is in its 1-position.

The position of the counter may be read with the aid of glow lamps $Z_1$, $Z_2$, $Z_3$ and $Z_4$ by closing a switch Y. As may be seen from the drawing, if switch Y is closed at a moment at which relay E is in its 0-position, lamps $Z_1$—$Z_4$ will be ignited in so far as the associated relays are in their 1-position. If switch Y is closed at a moment at which relay E is in its 1-position, lamps $Z_1$ and $Z_2$ will be ignited if the associated relays are in their 0-position, lamp $Z_3$ will be lighted if relay C is in its 1-position, and lamp $Z_4$ will be ignited if the positions of relays C and D are different. The operation of lamps $Z_1$—$Z_4$ is very similar to that of neon tubes 211—214 and 221—224 in the device shown in Fig. 1, with the exception, however, that a reading 11 in position 0 of the counter has been suppressed by means of a suitable cooperation of contacts $a_3$, $b_3$, $c_4$ and $d_3$, as will appear from the drawing.

The keys T (with the exception of the key bearing the number 0) are each provided with two switches S, which are moved, when the associated key is depressed, from the 0-position as shown through an intermediate position 1 to a bottom position 2, and which return from position 2 through position 1 to position 0 when the key is released. In general, one of the switches of each key is operative when relay E occupies its 0-position, and the other one when relay E occupies its 1-position; for this purpose, the switches are fed through contact $e_2$. However, at the keys marked with the numbers 4 and 7, the topmost switch is always operative, independently of the position of relay E.

For instance, if key 1 is depressed when relay E occupies its 0-position, the condenser connected with the topmost switch is charged when position 2 is reached. During the return movement of the key, this condenser is discharged in position 1, so that an impulse is transmitted to relay A, and the counter is set back through one step. If, on the other hand, key 1 is depressed when relay E occupies its 1-position, the condenser connected with the bottom switch is charged in position 1 during the downward movement. In position 2, this condenser is discharged, whereby an impulse is supplied to relay B, so that the counter is set back through two steps. During the return movement of the key, the said condenser is again charged in position 1; when position 0 is reached, the condenser is discharged, whereby an impulse is supplied to relay D, so that the counter is set back through 8 steps. Thus, in total, the counter is set back through 10 steps by the depression of key 1.

When key 4 is struck, the condenser connected with the topmost switch always supplies an impulse to relay 0 in position 1, so that the counter is set back through 4 steps. If relay E occupies its 0-position, nothing further happens. If relay E occupies its 1-position, the condenser connected with the bottom switch is charged in position 1 and discharged in position 2, whereby an impulse is supplied to relay A, and the counter is set back through one step. During the return movement of the key, the said condenser is again charged in position 1, whereby an impulse is supplied to relay B in position 0, so that the counter is set back through two steps. Thus, the counter is set back through 4 steps if key 4 is struck when relay E occupies its 0-position, and through 7 steps if key 4 is struck when relay E occupies its 1-position.

The following table shows, at what moments and to what relays impulses are supplied when the various keys are struck. Furthermore, it indicates the number of steps through which the counter is set back by these impulses.

| key | relay E in 0-position | | | | | s | relay E in 1-position | | | | | s |
|---|---|---|---|---|---|---|---|---|---|---|---|---|
| | 0 | 1 | 2 | 1 | 0 | | 0 | 1 | 2 | 1 | 0 | |
| 1 | ---- | ---- | ---- | A | ---- | 1 | ---- | ---- | B | ---- | D | 10 |
| 2 | ---- | ---- | ---- | B | ---- | 2 | ---- | ---- | A | ---- | D | 9 |
| 3 | ---- | ---- | A | ---- | B | 3 | ---- | ---- | ---- | D | ---- | 8 |
| 4 | ---- | C | ---- | ---- | ---- | 4 | ---- | C | A | ---- | B | 7 |
| 5 | ---- | ---- | A | ---- | C | 5 | ---- | ---- | B | ---- | C | 6 |
| 6 | ---- | ---- | B | ---- | C | 6 | ---- | ---- | A | ---- | C | 5 |
| 7 | ---- | C | A | ---- | B | 7 | ---- | C | ---- | ---- | ---- | 4 |
| 8 | ---- | ---- | ---- | D | ---- | 8 | ---- | ---- | A | ---- | B | 3 |
| 9 | ---- | ---- | A | ---- | D | 9 | ---- | ---- | ---- | B | ---- | 2 |
| 10 | ---- | ---- | B | ---- | D | 10 | ---- | ---- | ---- | A | ---- | 1 |

Relay E is changed over each time after a key has been struck by means of an auxiliary switch H, which is mechanically coupled with all keys T of the key board, so that switch H is always operated when a key is struck. In the bottom position of switch H, a condenser connected with this switch is charged; when the switch returns to its zero position, this condenser is discharged through contact $e_1$, whereby an impulse is supplied to the winding of relay E that is connected with said contact at this moment. Thus, relay E always changes its position as soon as a depressed key has returned to its initial position.

In so far as impulses may be supplied to the relays A, B, C and D through two or more conductors, these conductors are blocked with respect to each other by means of rectifiers G. Similar blocking rectifiers have been used, where necessary, at the switches S operated by the keys.

It is pointed out that in the most unfavorable case (i.e. if an impulse is supplied to relay C when the counter occupies position 0), six changes of position of one of the relays A, B, C and D must occur before the new position of the counter has been reached. Assuming the time required for operation of any of the relays A, B, C and D to be 5 milliseconds, 30 milliseconds must be available after each impulse transmitted by the keys for bringing the counter into its new position. Hence, the depression of a key must last 60 milliseconds, and the return movement of the key after it has been released must likewise take 60 milliseconds. If necessary, mechanical decelerating means must be provided for preventing a more rapid movement of the keys. Thus, each striking of a key takes 120 milliseconds, so that a theoretical speed of 8 digits per second may be reached, which appears to be amply sufficient.

The key bearing the inscription DK has been provided to enable a checking of the position of the decimal point in decimal fractions. The check symbols of the numbers 1, 10, 100, 1000, 10000, etc., are found to be: 1, 10, 1, 10, 1, etc. It appears to be logical to continue this series to the left and to ascribe the check symbol 10 to the number 0.1, the check symbol 1 to the number 0.01, the check symbol 10 to the number 0.001, etc. This means that the check symbol of a decimal fraction comprising $n$ digits after the decimal point is equal to the check symbol of a number containing the same digits as the decimal fraction, but having $n$ additional noughts after the last digit. For instance, the fraction 176.3598 will have the same check symbol as the number 17635980000. In consequence, the check symbol of a decimal fraction might be found by striking all digits on the key board of the device shown in Fig. 2, and adding as many noughts as there are digits after the decimal point. As the use of key 0 for this purpose would be rather confusing, it is preferred to provide a special key DK, having the same function as key 0. Thus, the check symbol of a decimal fraction will be found by striking the digits on keys 0–9 and by striking key DK one for each digit appearing after the decimal point.

Key DK may also be used for providing negative numbers with a special check symbol. As explained hereinbefore, a number Z having the check symbol $r_c$, is equal to $(11b+r_c)$, $b$ being a whole number. Hence, a number —Z would be equal to $$-(11b+r_c)=-11(b+1)+(11-r_c)$$

i.e. it would leave a remainder $(11-r_c)$ upon division by 11. Thus, it appears to be logical to ascribe the check symbol $(11-r_c)$ to the number —Z.

Now, as $10Z=110b+10r_c=110b+11r_c-r_c$, it will be clear that $R_{11}$ (10Z) will be equal to $(11-r_c)$. Thus, the check symbol of a negative number may be found by striking the digits on the key board, and adding one nought. The addition of the nought may again be performed by means of key DK, or a special "negative"-key may be provided for this purpose, having the same function as keys 0 and DK.

Figure 4:
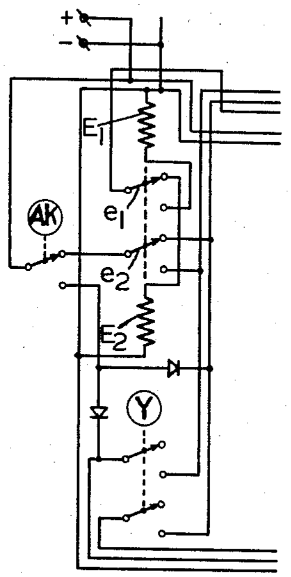
Fig. 4 shows a modification of the device shown in Fig. 2.

Fig. 4 shows a modification of the device shown in Fig. 2, which is useful in determining the check symbol of the sum of a plurality of numbers. As a number $Z_i$ is always equal to $11b_i+r_{ci}$, the sum $\Sigma Z_i$ of a plurality of numbers will be equal to $11\Sigma b_i+\Sigma r_{ci}$. Hence, the check symbol of the sum will be equal to $R_{11}(\Sigma r_{ci})$, i.e. the check symbol of a sum may be found by adding together the check symbols of all terms and subtracting the highest possible multiple of 11. Of course, a counter having a closed cycle of 11 positions automatically subtracts all multiples of 11, so that it may readily be used for the present purpose.

The circuit shown in Fig. 4 comprises an additional switch operated by means of a key AK. As long as this key occupies its neutral position as shown, the circuit is exactly the same as in Fig. 2. However, when key AK is depressed, relay E is removed from the circuit as far as the operation of the counter and the glow lamps is concerned, and the positive terminal of the voltage source is permanently connected with the line leading to the key switches which is normally operative in the 0-position of relay E and with the line leading to the glow lamps which is normally operative in the 1-position of relay E. Thus, the counter will be set back through $r_{ci}$ positions for each check symbol struck on the key board, and the check symbol of the sum will be indicated by the glow lamps.

Figure 3:
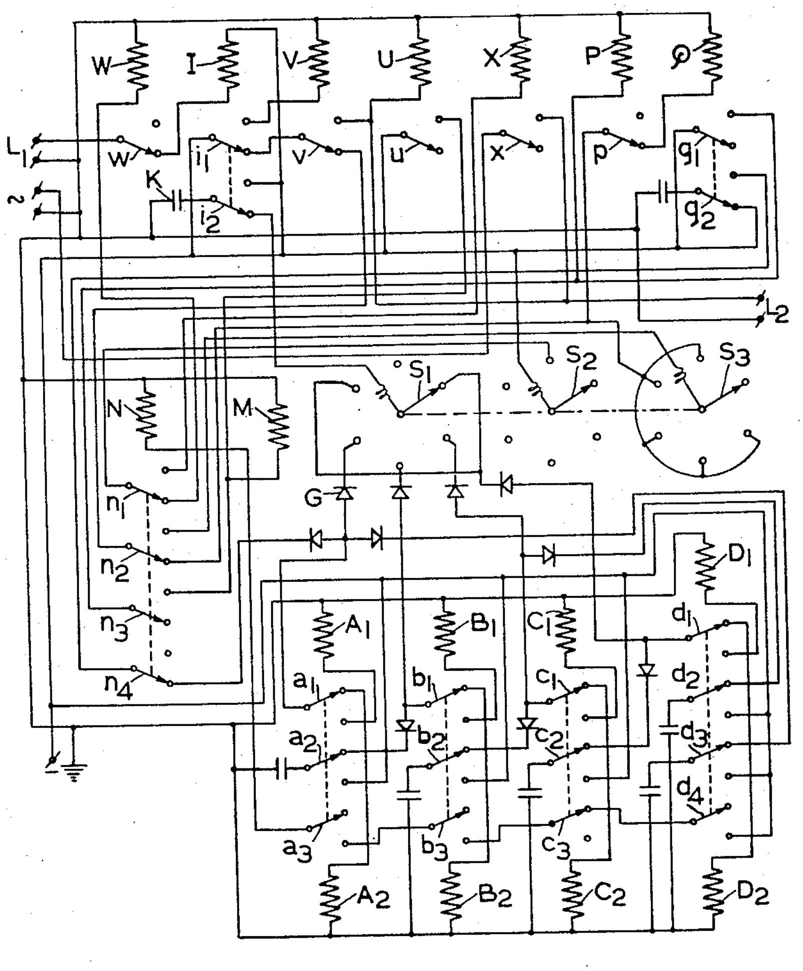
Fig. 3 is a circuit diagram of a device for checking symbol groups transmitted in the form of impulse trains, such as telephone numbers selected by means of a dial.

The circuit for checking telephone numbers shown in Fig. 3 is based on an arithmetical rule which is different from the rule on which the devices according to Figs. 1 and 2 are based. In fact, in the checking system on which the circuit according to Fig. 3 is based, a telephone number $$Z=\overline{p_n p_{n-1} \ldots p_2 p_1}$$

has a check symbol indicating the value $$r_c=R_{11}[4(p_1+2p_2+4p_3+8p_4+p_5+2p_6+ \ldots]$$

For instance, for a telephone number $\overline{a\ b\ c\ d}$ consisting of four digits we find:

$$r_c=R_{11}[4(8a+4b+2c+d)]$$

In computing $r_c$, the digit 0 is counted as 10, as is usual in the art of telephony. Similarly, if the value 10 is found for $r_c$, the digit 0 is used as a check symbol; no check symbol is added to a telephone number for which $r_c=0$; otherwise, the computed values of $r_c$ are used as check symbols.

Thus we find: for the telephone number 3476:

$$r_c=R_{11}(4\times 60)=R_{11}(240)=9$$

the digit 9 is used as a check symbol; for the telephone number 4705:

$$r_c=R_{11}(4\times 85)=R_{11}(340)=10$$

the digit 0 is used as a check symbol; for the telephone number 3682:

$$r_c=R_{11}(4\times 66)=R_{11}(264)=0$$

no check symbol is added.

The check symbol is dialled together with the telephone number by the calling subscriber; thus, instead of the number 3476, the number 34769 is dialled, instead of the number 4705 the number 47050; the number 3682 is left unchanged.

It may easily be seen that the check symbol of a telephone number as determined according to the above-described system is always changed when a wrong digit is dialled in one of the positions of the number or when two digits within a series of four consecutive digits change places. Hence, it is possible automatically to determine in the telephone exchange whether the number as dialled is right with the aid of the check symbol dialled together with the telephone number.

Fig. 3 relates to a circuit to be used in a telephone exchange for checking telephone numbers consisting of four digits, and transmitted together with their check symbol. For the sake of simplicity, it has been assumed that no telephone numbers are used for which $r_c=0$; in principle, these numbers may also be used without any objection, however.

The circuit shown in Fig. 3 comprises a relay counter, consisting of latch relays A, B, C and D, and substantially identical with the relay counter shown in Fig. 1. However, the 0-position of the relays has been used as a transfer position, relay C has three contacts, and relay D has four contacts. In checking a telephone number, position 11 (1 0 1 1) of the counter is used as a starting position. In this position, zero relay N is energized through contacts $d_4$, $c_3$, $b_3$ and $a_3$. As will be more fully explained hereinafter, before checking a telephone number, impulses are supplied to relay A, if necessary, until the zero relay N is energized. During the checking of a telephone number, the counter passes through positions 11, 12, 13, 14, 15, 5, 6, 7, 8, 9, 10, 11 and so on.

The checking of a received telephone number is performed in such manner that the impulse train corresponding with the first digit controls relay D, the counter being advanced through 8 steps by each impulse; the impulse train corresponding with the second digit controls relay C, so that the counter is advanced through 4 steps by each impulse; the third impulse train controls relay B, so that the counter is advanced through 2 steps by each impulse; the fourth impulse train controls relay A, so that the counter is advanced through one step by each impulse. Finally, the impulse train corresponding with the check symbol is again used for controlling relay D. Thus, if a subscriber dials the sequence $\overline{a\ b\ c\ d\ r_c}$, in which $\overline{a\ b\ c\ d}$ represents the telephone number proper, and $r_c$ the check symbol, the counter is advanced through $(8a+4b+2c+d+8r_c)$ steps, so that the final position of the counter is spaced with respect to the initial position over $t=R_{11}(8a+4b+2c+d+8r_c)$ steps. As $$r_c=R_{11}[4(8a+4b+2c+d)]=R_{11}(32a+16b+8c+4d)$$

we find: $t=R_{11}(264a+132b+66c+33d)=0$, i.e. the counter is returned to its initial position by the dialling of a telephone number with the appropriate check symbol. Hence, if the subscriber has made no errors in dialling the number the zero relay N is energized when the dialling is finished, whereby the desired connection is completed. On the other hand, if an error has been made in dialling, relay N is not energized, and in this case, the calling subscriber is disconnected.

The control of the counter by the received impulses is performed by means of relays I, U and V, and of a director switch having an operating winding N and three switch arms $S_1$, $S_2$ and $S_3$. Relays P and Q serve to return the counter and the director switch to their zero positions. Relay X serves for completing the desired connection, and relay W for disconnecting the calling subscriber.

The circuit of the calling subscriber is connected, through a preselector if desired, with the terminals $L_1$ shown on the left at the top of the drawing. When the subscriber lifts his telephone from the hook, thereby closing his circuit, terminals $L_1$ are interconnected, so that relay I is energized through contact $w$. Relay V is energized through contact $i_1$, and a condenser K connected with contact $i_2$ is charged through this contact.

The subscriber now dials the first digit; during the return movement of the dial, the subscriber's circuit is interrupted some times, whereby the first impulse train is obtained. Upon each interruption, relay I is de-energized, so that condenser K is discharged through contact $i_2$, switch arm $S_1$ and the winding of relay D which is in circuit for the time being. Hence, relay D is operated by each impulse of the first impulse train. Relay V is too slow to be de-energized during the duration of an impulse, so that it remains energized as long as the connection with the calling subscriber is maintained. At the first interruption of the subscriber's circuit, relay U is energized through contacts $i_1$ and $v$. This relay is too slow to be de-energized in the interval between two impulses, so that it remains energized until the end of the first impulse train. Through contact $u$, the winding N of the director switch is energized. Furthermore, the received impulses are supplied through contacts $i_1$ and $v$, and terminals $L_2$ to the usual selector switches for building up the desired connection.

At the end of the first impulse train, relay U is de-energized, so that magnet M of the director switch is de-energized and the director switch is displaced through one step. As a consequence, the second impulse train controls relay C through the second contact of switch arm $S_1$. In a similar manner, relay B is operated by the third impulse train, and relay A by the fourth one. After the fourth digit has been dialled, the connection has been built up. However, the output circuit of the final selector contains a resonance relay, which still interrupts the connection. Now, the calling subscriber dials the check symbol, whereby relay D is controlled through the fifth contact of switch arm $S_1$. After the check symbol has been dialled, the director switch reaches its sixth position. If the calling subscriber has not made an error, the zero relay N has been energized in the meantime, so that relay X is energized through battery $—S_2—n_1—X—$ ground. Through contact $x$, an alternating voltage is now supplied to terminals $L_2$; this voltage energizes the said resonance relay, whereby the connection with the desired subscriber is completed. If the calling subscriber has made an error, relay W is energized instead of relay X. Relay W opens its contact $w$, whereby the calling subscriber is disconnected.

If the calling subscriber is disconnected, or if he perceives that he has made a mistake and lays his telephone on the hook, relay V is de-energized. In general, the counter will not occupy position 11 at this moment, so that relay N is not energized. Relay Q is now energized through: battery $—i_1—v—n_2—p—Q—$ ground. Relay P is energized through contact $q_1$. The condenser connected with contact $q_2$ is discharged through contact $n_4$ and the winding of relay A which is in circuit at the moment in question, so that the counter is switched on through one step. By the energizing of relay P, contact $p$ is opened, so that relay Q is de-energized. This de-energizes relay P, and as soon as contact $p$ has again been closed as a consequence, the above described process is repeated. Thus, the counter is advanced until position 11 has been reached and relay N is energized.

After that, relay Q is energized through: battery $—i_1—v—n_2—S_3—p—Q—$ ground, so that magnet M of the director switch is energized through: battery $—q_1—n_3—M—$ ground. At the same time, relay P is energized, so that relay Q is de-energized and the circuit of magnet M is interrupted. The director switch is thereby displaced through one step. This process repeats itself until the director switch has reached its initial position, in which the circuit of relay Q is interrupted at $S_3$. The circuit is then ready for a new checking. If the subscriber's circuit is interrupted after a correct dialling, so that relay N is energized at the moment, at which relay V is de-energized, the director switch is immediately reset to its initial position.

For checking telephone numbers with more than four digits, the same circuit may be used, provided that the number of contacts of the director switch is correspondingly increased.

Fig. 5 shows a relay stage to be used for the purposes of the present invention, comprising two electromagnetic relays, to wit a relay 10 having a contact 11, and a relay 12 having a contact 13. Contact 11 is normally connected with the positive terminal of a voltage source. By means of a switch operated by a key IK, it is possible to interrupt the connection between contact 11 and the positive terminal, and to connect contact 13 with the positive terminal instead thereof.

The first time key IK is depressed, relay 10 is energized through contact 13; when the key is released, relay 10 is held through contact 11, and relay 12 is energized through the same contact. The second time key IK is depressed, the holding circuit of relay 10 is interrupted, so that relay 10 is de-energized, but relay 12 is held through contact 13; when the key is released, the holding circuit of relay 12 is interrupted, so that relay 12 is de-energized, and the initial condition of the relays is restored. Thus, the relay stage is found to have two stable conditions, to wit a 0-condition in which both relays are de-energized, and a 1-condition in which both relays are energized. By depression of key IK, the stage is changed over from one condition to the other one. It is pointed out that the impulse generated by depression of key IK has a double character; it consists of a current impulse supplied to contact 13 and of an interruption of the current normally supplied to contact 11.

Figure 6:
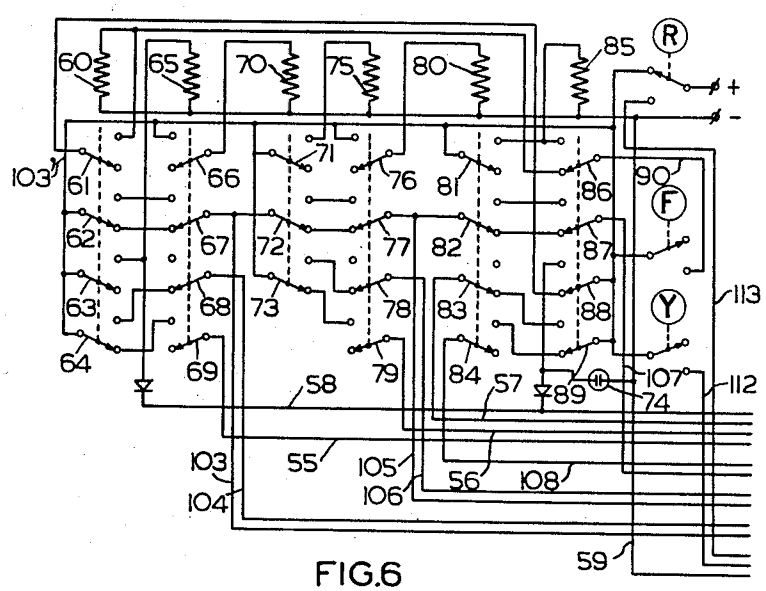
Fig. 6 is a circuit diagram of a timing unit used in a calculating device according to the invention for supplying impulses to the relay stages at the appropriate moments.
Figure 7:
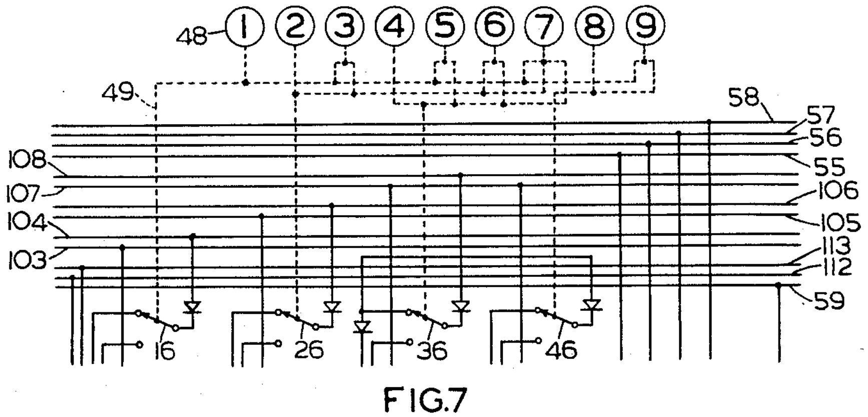
Fig. 7 is a circuit diagram of an operating unit for the same calculating device, comprised of a bank of keys, and a plurality of switches operated by these keys.
Figure 8:
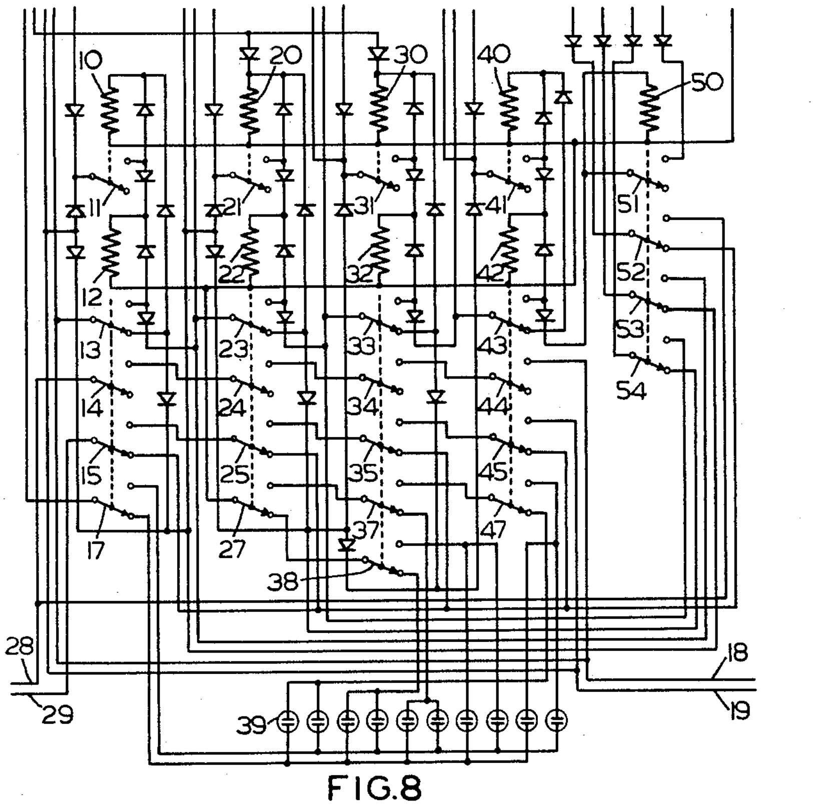
Fig. 8 is a circuit diagram of a calculating unit for said calculating device, comprising a relay counter, and means for suppressing the superfluous positions of said counter and for carrying over a unit to the next counter after each complete cycle.

Figs. 6, 7 and 8 relate to a calculating device, in which a plurality of numbers may be added together by means of an accumulating register, comprising a plurality of relay counters, each consisting of four relay stages, and in which each relay stage consists of two electromagnetic relays connected as shown in Fig. 5.

This calculating device is of the full key board type, i.e. it has a separate bank of keys for each decimal position. Each bank of keys is mechanically coupled with a series of four switches, by means of which the digits entered by means of the keys are broken down into their binary components. Furthermore, each bank of keys is associated with a calculating unit, comprising a relay counter, means for suppressing the superfluous positions of said counter, means for transferring a unit to the counter for the next higher decimal position after each complete cycle, and means for indicating the position of the counter.

Double impulses of the above-indicated type are supplied at appropriate moments to the relay stages of all calculating units by means of a common timing unit. This timing unit has been shown in Fig. 6; Fig. 7 shows a key unit, consisting of a bank of keys and four switches, and Fig. 8 show a calculating unit.

Referring to Fig. 7, there are shown nine keys 48, bearing the digits from 1 to 9. Although these keys are shown in a horizontal line, it will be understood that they are arranged, in reality, in a vertical line and that they constitute one of the vertical rows of keys of a full key board. As schematically indicated by dotted lines 49, the keys 48 are mechanically coupled with four switches 16, 26, 36 and 46, in such manner that one or more of these switches are changed over when a key is depressed, and that they return to their original position when the key is released. As is usual in full key board devices, locking means (not shown) are provided for keeping a depressed key in its depressed position, until it is released by special releasing means (not shown).

As appears from the drawing, switch 16 is operated by keys 1, 3, 5, 7 and 9, switch 26 by keys 2, 3, 6 and 7, switch 36 by keys 4, 5, 6 and 7, and switch 46 by keys 8 and 9. It is pointed out that switches 36 and 46 are never operated at the same time.

It will be understood that each binary component of a digit entered by means of one of the keys 48 is represented by a change-over of one of the switches. Thus, a binary component 1 is represented by a change-over of switch 16, a binary component 2 by a change-over of switch 26, a binary component 4 by a change-over of switch 36, and a binary component 8 by a change-over of switch 46.

Each of the switches 16, 26, 36 and 46 is associated with one of the relay stages of the counter and serves, when it has been changed over, to direct an impulse generated by the common timing unit to the associated relay stage. Hence, it will be understood that switches 16, 26, 36 and 46 constitute means for breaking down a digit to be entered in the counter into its binary components and for separately entering these components in the counter by directing an impulse to each relay stage representing one of the said components.

The calculating unit shown in Fig. 8 comprises four relay stages, to wit a first stage consisting of a relay 10 having a contact 11 and a relay 12 having contacts 13, 14, 15 and 17, a second stage consisting of a relay 20 having a contact 21 and a relay 22 having contacts 23, 24, 25 and 27, a third stage consisting of a relay 30 having a contact 31 and a relay 32 having contacts 33, 34, 35, 37 and 38, and a fourth stage consisting of a relay 40 having a contact 41 and a relay 42 having contacts 43, 44, 45 and 47. The unit further comprises a carry-over relay 50 having contacts 51, 52, 53 and 54, and a set of neon tubes 39 for indicating the position of the counter. Carry-over impulses are supplied to the calculating unit by the counter for the next lower decimal position through conductors 18 and 19, and from the calculating unit to the counter for the next higher decimal position through conductors 28 and 29.

Upon comparing the circuit arrangement of relays 10 and 12 with the circuit arrangement shown in Fig. 5, it will be seen that the connection of contact 13 have been slightly modified. If the first stage is in its 0-position (as shown), a current impulse directed to contact 13 is not only supplied to the winding of relay 10, but also to contacts 21, 31 and 41 of the next stages. If the first stage is in its 1-condition, a current impulse directed to contact 13 is not only supplied to the winding of relay 12, but also to contact 23 of the next stage. Contacts 21, 31 and 41 have the same function as contact 11, and contacts 23, 33 and 43 have substantially the same function as contact 13; however, contact 43 is connected, if the fourth stage is in its 1-condition, with the winding of relay 50. Thus, when an impulse is directed to contact 43 at a moment at which the fourth stage is in its 1-condition, relay 50 is energized, and prepares circuits for carrying over an impulse to the counter for the next higher decimal position and for transferring impulses to the second and third relay stages in order to suppress the superfluous positions of the counter. Contacts 14, 24, 34 and 44, and contacts 15, 25, 35 and 45 have a function in directing a carry-over impulse to the counter for the next higher decimal position, as will be explained hereinafter. Contacts 17, 27, 37, 38 and 47 prepare the circuits for the neon tubes 39.

The operation of the calculating unit will be described later on. Referring now to Fig. 6, it will be seen that the timing unit comprises six relays, to wit a relay 60 having contacts 61, 62, 63 and 64, a relay 65, having contacts 66, 67, 68 and 69, a relay 70 having contacts 71, 72 and 73, a relay 75 having contacts 76, 77, 78 and 79, a relay 80 having contacts 81, 82, 83 and 84, and a relay 85 having contacts 86, 87, 88 and 89. The unit further comprises a neon tube 74 and three switches operated by means of keys bearing the letters R, F and Y.

As stated hereinbefore, the timing unit is common to all calculating units. Thus, the calculating device consists of one timing unit as shown in Fig. 6, a plurality of key units as shown in Fig. 7, one for each decimal position, and a plurality of calculating units as shown in Fig. 8, one for each decimal position. The device is operated by means of a full key board consisting of the banks of keys 48 of all key units, and by the keys R, F and Y of the timing unit. The relay counters of all calculating units constitute an accumulating register, in which a plurality of numbers may be entered in order to compute their sum.

The timing unit is connected with the calculating units by means of conductors 55—59, 103—108, and 112—113 shown in Figs. 6 and 7. Conductor 59 is permanently connected with the negative terminal of the voltage source.

The operation of the calculating device is as follows. If the timing unit is in the condition as shown in Fig. 6, the positive terminal of the voltage source is connected with a conductor 103′, so that a positive voltage is supplied to conductor 103 through contacts 62 and 67, to conductor 105 through contacts 62, 67, 72 and 77, and to conductor 107 through contacts 62, 67, 72, 77, 82 and 87. In each calculating unit, contact 11 is connected with conductor 103, contact 21 with conductor 105, and contacts 31 and 41 with conductor 107, as will appear from Figs. 7 and 8. Thus, all relays of the relay counter are held in the existing condition.

If it is desired to clear the register in order to start a new calculation, key R is depressed, so as to break the circuit of conductor 103′ and to connect the positive terminal with conductor 113. Thus, the holding circuits of all relays in the relay counters are interrupted; at the same time, relays 20 and 30 of each calculating unit are energized through conductor 113. When key R is released, holding circuits for relays 20 and 30 are established and relays 22 and 32 in each calculating unit are energized through contacts 21 and 31, respectively. Thus, all relay counters are brought into position 6, in which the first and fourth stages are in the 0-condition and the second and third stages in the 1-condition (0 1 1 0). Position 6 is the zero or starting position of all relay counters; these counters have a closed cycle of 10 positions, consisting of positions 6 to 15. After each complete cycle, impulses are supplied to the second and third stages in order to suppress positions 0 to 5.

The numbers to be added together may now be entered in the calculating device by means of the key board. Each number is entered by striking the digits on the key board, depressing key F to start the timing unit, and releasing the keys by means for the releasing device (not shown). When it is desired to read the register, key Y is depressed so as to close the circuit of neon tubes 39.

By striking the digits of a number on the key board, switches 16, 26, 36 and 46 of each key unit are set in accordance with the binary components of the digit occurring in the decimal position in question, as explained hereinbefore.

When key F is depressed, relay 60 is energized through conductor 90 and contact 86, so that contacts 61—64 are changed over. Contact 61 completes a holding circuit for relay 60 through contact 88, so that key F may be released, if desired. Contact 62 breaks the circuit of conductors 103, 105 and 107, so that the holding circuits of all relay stages in each calculating unit are interrupted. Contact 63 supplies a positive voltage to the winding of relay 65, and to conductor 58. Contact 64 supplies a positive voltage to conductor 104.

Referring now to Figs. 7 and 8, it will be seen that the positive voltage on conductor 104 is supplied to switch 16. If switch 16 is in its 0-position as shown, the voltage is supplied to contacts 11, 21, 31 and 41, so that all relays of the counter are held in their existing position. If switch 16 is in its 1-position, the voltage is supplied to contact 13.

If the first relay stage is in its 0-condition, the voltage is now supplied to the winding of relay 10 and to contacts 21, 31 and 41, so that relay 10 is energized and all other relays of the counter remain in their existing position.

If the first relay stage is in its 1-condition, the voltage is supplied to the winding of relay 12 and to contact 23. Relay 10 is de-energized; the operation of the remaining stages depends on the condition of the second stage.

If the second stage is in its 0-condition, the voltage is supplied to the winding of relay 20 and to contacts 31 and 41, so that relay 20 is energized and the third and fourth stages are held in their existing condition.

If the second stage is in its 1-condition, the voltage is supplied to the winding of relay 22 and to contact 33. Relay 20 is de-energized; the operation of the third and fourth stages depends on the condition of the third stage.

If the third stage is in its 0-condition, the voltage is supplied to the winding of relay 30 and to contact 41, so that relay 30 is energized and the fourth stage is held in its existing condition.

If the third stage is in its 1-condition, the voltage is supplied to the winding of relay 32 and to contact 43. Relay 30 is de-energized, and the operation of the fourth stage depends on its condition.

If the fourth stage is in its 0-condition, the voltage is supplied to the winding of relay 40, so that relay 40 is energized.

If the fourth stage is in its 1-condition, the voltage is supplied to the winding of relay 42 and to the winding of relay 50, so that relay 40 is de-energized and relay 50 is energized.

It will be understood that the relays of the group 10, 20, 30, 40 and 50 that are energized in the above-described process, operate simultaneously, so that the new position of these relays is reached in a very short time.

In the meantime, relay 65, which was energized through contact 63, has found time to change over its contacts 66—69. Contact 66 supplies a positive voltage to the winding of relay 70. Contact 67 restores the circuit of conductors 103, 105 and 107. Contact 68 interrupts the circuit of conductor 104. Contact 69 prepares a circuit for conductor 55, which is still interrupted, however, by contact 64.

The voltage, which is now again supplied to conductors 103, 105 and 107, energizes, the relays 12, 22, 32 and 42 in those stages, in which the corresponding relay 10, 20, 30 or 40 has been energized during the preceding period, so that these stages are brought into their 1-condition. All other stages are kept in their existing condition. If relay 50 has been energized, it is held through conductor 58 and contact 51.

Relay 70, energized through contact 66, now changes over its contacts 71, 72 and 73. Contact 71 supplies a positive voltage to the winding of relay 75. Contact 72 breaks the circuit of conductors 105 and 107, so that the holding circuits of the second, third and fourth relay stages in each calculating unit are interrupted; however, the circuit of conductor 103 is not interrupted so that the first stage of each calculating unit is kept in its existing condition. Contact 73 supplies a positive voltage to conductor 106.

As appears from Figs. 7 and 8, the voltage on conductor 106 is supplied to switch 26. If this switch is in its 0-position (as shown), the voltage is supplied to contacts 21, 31 and 41, so that all relays of the counter are kept in their existing position. If switch 26 is in its 1-position, the voltage is supplied to contact 23, and the same operation as described hereinbefore follows.

Relay 75 energized through contact 71, now changes over its contact 76—79. Contact 76 supplies a positive voltage to the winding of relay 80. Contact 77 restores the circuit of conductors 105 and 107, causing the same operation as described hereinbefore with reference to contact 67. Contact 78 interrupts the circuit of conductor 106. Contact 79 prepares a circuit for conductor 56, which is still interrupted, however, by contact 73.

Relay 80 now changes over its contacts 81—84. Contact 81 supplies a positive voltage to the winding of relay 85. Contact 82 breaks the circuits of conductor 107, so that the holding circuit of the third and fourth stages in each calculating unit are interrupted; however, the circuits of conductors 103 and 105 are not interrupted, so that the first and second stages of each calculating unit are held in their existing condition. Contact 83 has no particular function at the present moment. Contact 84 connects conductor 108 with contact 89, so that a positive voltage is supplied to conductor 108 through contacts 89 and 84.

The positive voltage on conductor 108 is supplied to switch 36 (Fig. 7). As stated hereinbefore, switches 36 and 46 are never changed over at the same time. Thus, if switch 36 is in its 1-position, switch 46 is always in its 0-position, and if switch 46 is in its 1-position, switch 36 is always in its 0-position. Use is made of this circumstance by supplying the control impulses to the third and fourth stages of the calculating units at the same time.

If switch 36 is in its 1-position, the voltage appearing on conductor 108 is supplied to contact 33, and the operation is exactly as described hereinbefore.

If switch 36 is in its 0-condition, the voltage is supplied to contact 31, so as to hold the third stage in its existing condition, and to switch 46.

If switch 46 is in its 1-condition, the voltage is supplied to contact 43, and the operation is exactly as described hereinbefore.

If switch 46 is in its 0-condition, the voltage is supplied to contact 41 so as to hold the fourth stage in its existing condition.

Relay 85 (Fig. 6), energized through contact 81, now changes over its contacts 86—89. Contact 86 breaks the connection between conductor 90 and the winding of relay 60. Contact 87 restores the circuit of conductor 107, causing the same operation as described hereinbefore with reference to contact 67. Contact 88 interrupts the holding circuit of relay 60, and prepares a new holding circuit for the relays 50 of all calculating units by connecting the positive terminal of the voltage source with conductor 58; at the same time, a neon tube 74 is ignited in order to signify to the operator that the keys of the full key board may be released, and a new number may be entered. Contact 89 breaks the circuit of conductor 108, and prepares a circuit for conductor 57, which is still interrupted, however, by contact 83.

As both energizing circuits of relay 60 are interrupted by contacts 86 and 88, respectively, relay 60 is de-energized, and contacts 61—64 are returned to their initial position. Contact 61 has no particular function at the present moment. Contact 62 breaks the circuit of conductors 103, 105 and 107, so as to interrupt the holding circuits of all relay stages of each calculating unit. Contact 63 interrupts the energizing circuit of relay 65, and breaks the circuit of conductor 58, which is of no consequence, however, since a new circuit for conductor 58 has been established through contact 88. Contact 64 supplies a positive voltage through contact 69 to conductor 55.

As appears from Figs. 7 and 8, the voltage occurring on conductor 55 is supplied to contact 52 in each calculating unit. This voltage causes a "one" to be carried over to the calculating unit for the next higher decimal position, if necessary. It is pointed out that the carry-over is performed by supplying a voltage to conductor 28 which is connected with conductor 18 of the next calculating unit. If there is no carry-over, the same voltage is supplied to conductor 29, which is connected with conductor 19 of the next calculating unit.

As appears from the drawing, a voltage appearing on conductor 18 is supplied to contact 13, so as to cause a "one" to be entered in the counter in the manner described hereinbefore, and a voltage appearing on conductor 19 is supplied to contacts 11, 21, 31 and 41, so as to hold all stages of the counter in their existing condition.

There are two cases in which a "one" must be carried over to a calculating unit. In the first case, the carry-over relay 50 of the preceding calculating unit has been energized. In the second case, a "one" is carried over to the preceding calculating unit at a moment at which this unit registers a 9 (for instance, if 1 is added to 99, the "one" carried over from the lowest decimal position to the second one must also be carried over to the third decimal position). These two cases do never occur simultaneously, since it is impossible for a calculating unit to register a 9 and to have its carry-over relay energized at one and the same time.

As position 6 is the starting or zero position of all calculating units, a unit registering a 9 is in position 15, in which all relay stages are in the 1-condition. Thus, referring to Fig. 8, an impulse must be supplied to conductor 28 in two cases, to wit:

(*a*) when relay 50 is energized, and (*b*) when all relay stages are in the 1-condition and an impulse is received through conductor 18.

In all other cases, an impulse must be supplied to conductor 29.

As appears from Fig. 8, if relay 50 is energized, the voltage directed to contact 52 is supplied to conductor 28. If relay 50 is not energized and at least one of the four relay stages is in its 0-condition, the same voltage is supplied through one or more of contacts 15, 25, 35 and 45 to conductor 29. If relay 50 is not energized and all relay stages are in their 1-condition, a voltage appearing on conductor 18 is supplied to conductor 28 through contacts 44, 34, 24 and 14, and a voltage appearing on conductor 19 is supplied to conductor 29 through contacts 45, 35, 25 and 15. Thus, it will be understood that a "one" is carried over to the next unit whenever this is necessary.

In the meantime, relay 65 (Fig. 6), having been de-energized by contact 63, has returned its contacts 66—69 to their initial position. Contact 66 breaks the circuit of the winding of relay 70. Contact 67 restores the circuits of conductors 103, 105 and 107. Contact 68 has no particular function at the present moment. Contact 69 breaks the circuit of conductor 55. The restoration of the circuits of conductors 103, 105 and 107 has the same effect as described hereinbefore.

Relay 70 now changes over its contacts 71—73 to their initial position. Contact 71 breaks the circuit of the winding of relay 75. Contact 72 breaks the circuits of conductors 105 and 107. Through contacts 73 and 79, a positive voltage is supplied to conductor 56.

As appears from Figs. 7 and 8, the voltage occurring on conductor 56 is supplied to contact 53 in all calculating units. If relay 50 is in its 0-position (as shown), this voltage is supplied to contacts 21, 31 and 41, so as to hold all relay stages in their existing condition. If relay 50 is in its 1-position, the said voltage is supplied to contact 23, so as to advance the counter through two steps.

Relay 75 returns its contacts 76—79 to their initial position. Contact 76 breaks the circuit of the winding of relay 80. Contact 77 restores the circuits of conductors 105 and 107. Contact 78 has no particular function at the present moment. Contact 79 breaks the circuit of conductor 56.

Relay 80 returns its contacts 81—84 to their initial position. Contact 80 breaks the circuit of the winding of relay 85, unless key F is still in its depressed position and holds relay 85 through contact 86. Contact 82 breaks the circuit of conductor 107. Through contacts 89 and 83, a voltage is supplied to conductor 57. Contact 84 has no particular function at the present moment.

The voltage on conductor 57 is supplied to contact 54 in each calculating unit. If relay 50 is in its 0-position, this voltage is supplied to contacts 31 and 41, so as to hold all relay stages in their existing condition. If relay 50 is in its 1-position, the said voltage is supplied to contact 33, so as to advance the counter through four steps.

If key F has been released in the meantime, contacts 86—89 of relay 80 are returned to their initial position. Contact 86 has no particular function at this moment. Contact 87 restores the circuit of conductor 107. Contact 88 breaks the circuit of conductor 58, so that the carry-over relays 50 in all calculating units are de-energized; at the same time neon tube 74 is extinguished. Contact 89 breaks the circuit of conductor 57. Thus, the timing unit is again in its initial condition.

If it is desired to read the postion of the counters, key Y is depressed, whereby a positive voltage is supplied to conductor 112. This voltage is directed to contact 17 in each calculating unit. Contact 27 is permanently connected with conductor 59. As position 6 is the zero or starting position of each counter, 6 must be subtracted from the position of the counter in order to find the digit registered therein. Upon considering the circuit arrangement of neon tubes 39, it will be found that the first tube from the left is ignited if the counter is in position 6, the second if the counter is in position 7, and so on, so that the tubes indicate, from left to right, the digits from 0 to 9.

It will be understood that other indicators could be used instead of the tubes 39. For instance, if it is desired to print the totals or sub-totals, tubes 39 may be replaced by printing magnets.

In order that relays 10, 12, 20, 22, 30, 32, 40, 42 and 50 have enough time to change their positions during the operation of the timing unit, they must be constructed in such manner as to be somewhat quicker in operation than relays 60, 65, 70, 75, 80 and 85.

Subtractions may be performed by means of the above-described calculating device by entering the complementary value of each digit of the subtractor. As is well known in the art, this complementary value is $(10-p)$ for a digit $p$ in the first position from the right of the subtractor, and $(9-p)$ for a digit $p$ in any other position. The complementary values may be indicated on the keys 48 in known manner.

Multiplications may be performed by repeated addition, and divisions by repeated subtraction.

Figure 9:
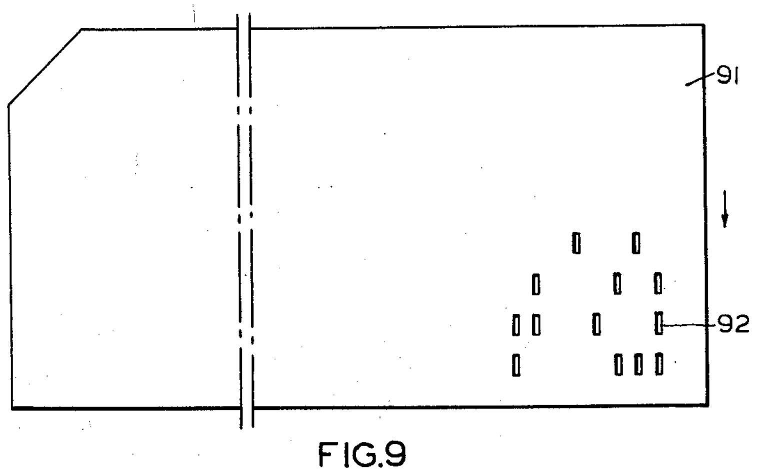
Fig. 9 shows a punched card used for operating a calculating device according to the invention.

As the calculating device shown in Figs. 6, 7 and 8 has the property that the binary components of each digit are separately entered in each relay counter, the device may easily be modified in such manner that it can be controlled by punched cards having separate punching holes for each binary component. Fig. 9 shows a punched card of this kind, and Fig. 10 shows a modified control unit to be substituted for the unit shown in Fig. 7 for control by punched cards.

The card 91 shown in Fig. 9 is provided with holes 92 punched at four different levels. The lowest level serves for registering a binary component 1, the second for registering a binary component 2, the third for registering a binary component 4, and the fourth for registering a binary component 8. By way of example, holes have been shown for registering the number 36082597. The card is scanned by passing it through a scanning device in the direction indicated by the arrow, so that the holes indicating the binary component 1 are the first to be scanned.

Figure 10:
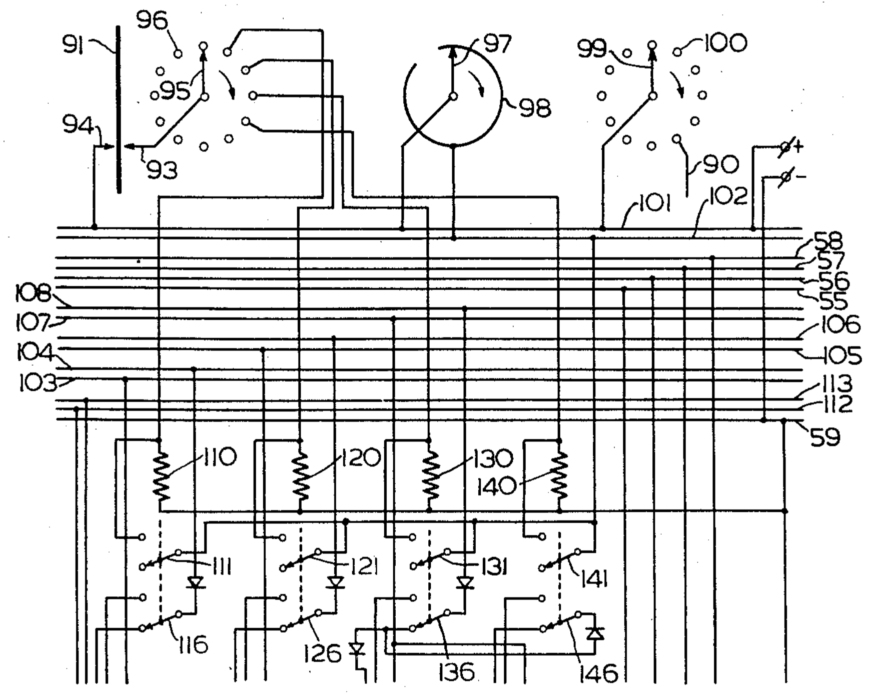
Fig. 10 shows a modification of the unit shown in Fig. 7, adapted to be operated by the punched card shown in Fig. 9.

The unit shown in Fig. 10 comprises four relays, to wit a relay 110 having contacts 111 and 116, a relay 120 having contacts 121 and 126, a relay 130 having contacts 131 and 136 and a relay 140 having contacts 141 and 146. Contacts 111, 121, 131 and 141 are holding contacts; contacts 116, 126, 136 and 146 are fully equivalent to switches 16, 26, 36 and 46 in Fig. 7.

Scanning means for scanning a certain column of a punched card are schematically indicated at 93 and 94. It will be understood that a contact will be made between members 93 and 94 whenever they pass over a hole in the card 91. Member 94 is connected with a conductor 101 leading to the positive terminal of the voltage source. Member 93 is connected with the switch arm 95 of a rotatory switch; this switch arm is moved over a bank of contacts 96 in synchronism with the movement of card 91.

The four relays 110, 120, 130 and 140, the scanning members 93 and 94 and the switch 95—96 are individual to one of the calculating units, i.e. a set of these parts is provided for each decimal position.

The drawing further shows two rotatory switches that are common to all calculating units, to wit a switch having a switch arm 97 and a contact path 98, and a switch having a switch arm 99 and a bank of contacts 100. Switch 97—98 serves to interrupt the holding circuits of relays 110, 120, 130 and 140 at a certain point of the cycle of the scanning mechanism. For this purpose, switch arm 97 is connected with conductor 101, and contact path 98 with a conductor 102, connected with the contacts 111, 121, 131 and 141 of all control units. Switch 99—100 has the same function as key F in the timing unit shown in Fig. 6. For this purpose, switch arm 99 is connected with conductor 101, and the fifth contact of bank 100 is connected with conductor 90 (Fig. 6).

Rotatory switches 95—96, 97—98 and 99—100 are moved in the direction of the arrows, i.e. in clockwise direction.

The operation of the unit shown in Fig. 10 is as follows. As the card 91 passes the scanning members 93 and 94, the level on this card representing a binary component 1 reaches the scanning members at the moment at which switch arm 95 passes the first contact of bank 96, counting from the zero position of the switch arm as shown. If a hole has been punched in the card on this level, relay 110 is energized. The level representing a binary component 2 passes the scanning members at the moment at which the switch arm 95 passes the second contact; if a hole has been punched on this level, relay 120 is energized. In the same way, relay 130 will be energized if a hole has been punched on the third level, and relay 140 if a hole has been punched on the fourth level. As soon as the four relays have been set in their appropriate positions, corresponding with the binary components of the digit registered in the card, switch arm 99 reaches the contact of bank 100 that is connected with conductor 90, so that the timing unit (Fig. 6) is started. From now on, the operation of the calculating device is exactly as described hereinbefore. After the digits registered in the card have been properly entered in the accumulating register of the calculating device, switch arm 97 interrupts the holding circuits of relays 110, 120, 130 and 140, so that these relays are returned to their initial position.

Although the invention has been described hereinbefore by reference to some specific embodiments, it will be understood that these embodiments have only been shown and described by way of example, and that many modifications are possible within the scope of the invention as defined in the appended claims.

We claim:

1. A device for determining a check symbol for a symbol group, and for checking a symbol group already provided with a check symbol, comprising a relay counter consisting of a plurality of relay stages, each having two stable conditions and each adapted to change its condition upon reception of an impulse and to remain in the new condition until the reception of a next impulse, and means in each relay stage except the last one for transferring an impulse to the next relay stage whenever it is changed over to one of its two stable conditions, means for skipping at least one position of said relay counter, a plurality of symbol entering means each for a different symbol, a plurality of switches each representing a different binary component and coupled with the said symbol entering means in such manner that, upon entering a symbol, the switches corresponding with the binary components of a value ascribed to the inserted symbol are changed over, a change-over device, means for operating said change-over device after each insertion of a symbol, a plurality of contacts operated by said change-over device, and means for successively supplying one impulse to each relay stage of said relay counter only after a circuit has been prepared through said switches and through the contacts operated by said change-over device.

2. A device for determining a check symbol for a number and for checking a number already provided with a check symbol, comprising a relay counter consisting of four electronic trigger circuits, each having two stable conditions and each adapted to change its condition upon reception of an impulse and to remain in the new condition until the reception of a next impulse, and means in each trigger circuit except the last one for transferring an impulse to the next trigger circuit whenever it is changed over to one of its two stable conditions, means for skipping five positions in said relay counter, a plurality of keys each for a different digit, four switches each representing a different binary component and coupled with the said keys in such manner that, upon entering a digit, the switches corresponding with the binary components of said digit are changed over, a change-over device, means for operating said change-over device after each insertion of a symbol, a plurality of contacts operated by said change-over device, four electronic impulse generators each associated with one of the said trigger circuits and having different time constants so as to generate impulses at different moments, and means connecting each of the said impulse generators with its associated trigger circuit through the said switches and the said contacts in such manner that, when a digit $p$ has been entered by means of one of the said keys, the value entered in said relay counter is equal to $p$ in one of the conditions of said change-over device, and equal to $(11-p)$ in the other condition of said change-over device.

3. A device for determining a check symbol for a symbol group and for checking a symbol group already provided with a check symbol, comprising a relay counter consisting of a plurality of relay stages each having two stable conditions and each adapted to change its condition upon reception of an impulse and to remain in the new condition until the reception of a next impulse, and means in each relay stage except the last one for transferring an impulse to the next relay stage whenever it is changed over to one of its two stable conditions, means for skipping at least one idle position of said relay counter, a plurality of symbol entering means each for a different symbol, a plurality of sets of switches, each set associated with one of said symbol inserting means and each comprising at least two switches coupled and associated with each of said symbol inserting means so as to be operated together therewith and adapted to pass through a plurality of different positions during the insertion of a symbol and to transmit an impulse to one of the said relay stages in at least one of these positions, a change-over device operable between two positions, means for operating said change-over device after each insertion of a symbol, and means for causing said two switches associated with each symbol inserting means to alternately control transmission of impulses in dependence upon alternative positions of said change-over device.

4. A calculating device, comprising a plurality of digit entering units each for a different decimal position, a plurality of calculating units each associated with one of said digit entering units, a common timing unit adapted to transmit a plurality of successive impulses to said digit entering and calculating units, said timing unit comprising a plurality of relays each having a plurality of contacts and means for successively energizing said relays and for successively de-energizing them in the same order, said successive impulses being each transmitted through series connected contacts of two adjacent relays, each calculating unit comprising four relay stages, each having two stable conditions and each adapted to change its condition upon reception of an impulse and to remain in the new condition until the reception of a next impulse, means in each of the first three relay stages for transferring an impulse to the next relay stage whenever it is changed over to one of its two stable conditions, a carry-over relay, means in the fourth relay stage for energizing said carry-over relay whenever it is changed over to one of its two stable conditions, and means operative when said carry-over relay has been energized for directing impulses transmitted by said timing unit to the second and third relay stages for skipping the idle six positions of said calculating unit and to at least one calculating unit for a higher decimal position for carry-over purposes, and each digit entering unit comprising a plurality of keys each for a different digit, four switches each representing a different binary component and coupled with the said keys in such manner that, upon entering a digit, the switches corresponding with the binary components of said digit are changed over, and means for directing impulses transmitted by said timing unit through each of the said switches that has been changed over to the corresponding relay stage of the associated calculating unit, and further comprising means for starting said timing unit, and for de-energizing the carry-over relays of all calculating units after a complete cycle of said timing unit.

5. A calculating device, comprising a plurality of digit entering units each for a different decimal position, a plurality of calculating units each associated with one of said digit entering units, and a common timing unit adapted to transmit a plurality of successive impulses to said digit entering and calculating units, each calculating unit comprising four relay stages, each having two stable conditions and each adapted to change its condition upon reception of an impulse and to remain in the new condition until the reception of a next impulse, means in each of the first three relay stages for transferring an impulse to the next relay stage whenever it is changed over to one of its two stable conditions, a carry-over relay, means in the fourth relay stage for energizing said carry-over relay whenever it is changed over to one of its two stable conditions, and means operative when said carry-over relay has been energized for directing impulses transmitted by said timing unit to the second and third relay stages for skipping the idle six positions of said calculating unit and to at least one calculating unit for a higher decimal position for carry-over purposes, and each digit entering unit comprising a plurality of keys each for a different digit, four switches each representing a different binary component and coupled with the said keys in such manner that, upon entering a digit, the switches corresponding with the binary components of said digit are changed over, and means for directing impulses transmitted by said timing unit through each of the said switches that has been changed over to the corresponding relay stage of the associated calculating unit, means for starting said timing unit and for de-energizing the carry-over relays of all calculating units after a complete cycle of said timing unit, each of said relay stages comprising a first electromagnetic relay having a first winding and a first contact and a second electromagnetic relay having a second winding and a second contact, said first contact being connected in its working position with both of said windings, and said second contact being connected with said first winding in its rest position and with said second winding in its working position, so that the relay stage stable conditions comprise a first stable condition in which both relays are de-energized and a second stable condition in which both relays are energized, and in which each of the said impulses is a double impulse which consists of applying a voltage to said second contact and interrupting a voltage normally applied to said first contact in the relay stage to which the impulse is supplied.

References Cited in the file of this patent

UNITED STATES PATENTS

| | | |
|---|---|---|
| 2,191,567 | Hofgaard | Feb. 27, 1940 |
| 2,364,540 | Luhn | Dec. 5, 1944 |
| 2,375,332 | Torkelson | May 8, 1945 |
| 2,623,115 | Woods-Hill | Dec. 23, 1952 |
| 2,634,052 | Bloch | Apr. 7, 1953 |
| 2,658,681 | Palmer | Nov. 10, 1953 |
| 2,718,633 | Fennessy | Sept. 20, 1955 |
| 2,749,440 | Cartwright | June 5, 1956 |
| 2,759,669 | Knutsen | Aug. 21, 1956 |
| 2,776,091 | Chenus | Jan. 1, 1957 |